(12) United States Patent
Morovic et al.

(10) Patent No.: US 10,391,709 B2
(45) Date of Patent: Aug. 27, 2019

(54) 3D OBJECT DATA

(71) Applicant: HEWLETT-PACKARD DEVELOPMENT COMPANY, L.P., Houston, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 30 days.

(21) Appl. No.: 15/545,775

(22) PCT Filed: Jan. 30, 2015

(86) PCT No.: PCT/EP2015/051939
§ 371 (c)(1),
(2) Date: Jul. 24, 2017

(87) PCT Pub. No.: WO2016/119879
PCT Pub. Date: Aug. 4, 2016

(65) Prior Publication Data
US 2018/0022029 A1 Jan. 25, 2018

(51) Int. Cl.
*G05B 19/40* (2006.01)
*B29C 64/386* (2017.01)
(Continued)

(52) U.S. Cl.
CPC ............ *B29C 64/386* (2017.08); *B33Y 50/00* (2014.12); *G05B 19/4099* (2013.01);
(Continued)

(58) Field of Classification Search
None
See application file for complete search history.

(56) References Cited

U.S. PATENT DOCUMENTS 8,175,734 B2  5/2012  Yi et al.
8,509,933 B2  8/2013  Steingart et al.
(Continued)

FOREIGN PATENT DOCUMENTS

WO    WO-2014141273    9/2014

OTHER PUBLICATIONS

Chi Zhou et al.: "Transactions of NAMRI/SME, Three-Dimensional Digital Halftoning for Layered Manufacturing Based on Droplets," Jan. 1, 2009 (8 pages).

(Continued)

*Primary Examiner* — Thomas C Lee
*Assistant Examiner* — Gary Collins
(74) *Attorney, Agent, or Firm* — HP Inc. Patent Department (57) ABSTRACT

Methods and apparatus relating to representation of a three-dimensional object are described. In an example, a converter for converting input object data representing a model of a three-dimensional object into a compressed form is provided. The converter comprises a data receiving module to receive data representing object properties of a three-dimensional object to be generated by additive manufacturing apparatus and a data identifying module to identify data representing a continuous region of the object with a common property specification. The converter further comprises a sub-region defining module to determine, within the data representing the continuous region, a set of contiguous sub-regions and an object data module to represent the continuous region as the set of sub-regions.

20 Claims, 3 Drawing Sheets

(51) Int. Cl.
  *G06T 19/00* (2011.01)
  *B33Y 50/00* (2015.01)
  *G05B 19/4099* (2006.01)
  *H04N 1/405* (2006.01)

(52) U.S. Cl.
  CPC .... *G06T 19/00* (2013.01); *G05B 2219/49023* (2013.01); *H04N 1/405* (2013.01)

(56) References Cited

U.S. PATENT DOCUMENTS

| | | | | |
|---|---|---|---|---|
| 2011/0087350 | A1* | 4/2011 | Fogel | G06F 17/50 700/98 |
| 2011/0222081 | A1* | 9/2011 | Yi | G06T 17/00 358/1.9 |
| 2012/0299917 | A1* | 11/2012 | Kumar | G06F 17/5009 345/420 |

OTHER PUBLICATIONS

Cho et al: "A dithering algorithm for local composition control with three-dimensional printing," Computer Aided Design, Elsevier Publishers BV., Barking, GB, vol. 35, No. 9, Aug. 1, 2003 (17 pages).
European Patent Office, International Search Report and Written Opinion for PCT/EP2015/051939 dated Nov. 25, 2015 (13 pages).
Fei, Y. et al., Point-Tessellated Voxelization, Graphics Interface Conference 2012, May 28-30, 2012 (9 pages).
http:/what-when-how.com/ "Modelling Three-Dimensional Objects (Introduction to Computer Graphics Using Java 2D and 3D) Part 1," Sep. 13, 2013 (13 pages).
Kratt, J. et al.,Non-realistic 3D Object Stylization, Aug. 8, 2014 (9 pages).
Mueller, S. et al., faBrickation: Fast 3D Printing of Functional Objects by Integrating Construction Kit Building Blocks, Apr. 26-May 1, 2014 (8 pages).

* cited by examiner

3D OBJECT DATA

BACKGROUND

Three-dimensional objects generated by an additive manufacturing process are formed in a layer-by-layer manner. In one example of additive manufacturing, an object is generated by coalescing and solidifying portions of layers of build material. In examples, the build material may be in the form of a powder, fluid or sheet material. The intended coalescence, solidification and/or physical properties may be achieved by printing an agent onto a layer of the build material. Energy may be applied to the layer and the build material on which an appropriate agent has been printed may coalesce and solidify upon cooling. In other examples, three-dimensional objects may be generated by using extruded plastics or sprayed materials as build materials, which solidify to form an object.

Some printing processes that generate three-dimensional objects, use control data generated from a model of a three-dimensional object. This control data may, for example, specify the locations at which to apply an agent to the build material, or where a build material itself may be placed.

BRIEF DESCRIPTION OF DRAWINGS

For a more complete understanding, reference is now made to the following description taken in conjunction with the accompanying drawings in which.

DETAILED DESCRIPTION

Some examples described herein provide an apparatus and a method for generating control data that may be used to produce a three-dimensional object. Some examples allow arbitrary three-dimensional content with a variety of specified object properties to be processed and used to generate a three-dimensional object. These object properties may comprise appearance properties (color, transparency, glossiness, etc), conductivity, density, porosity and/or mechanical properties such as strength.

In some examples herein, three-dimensional space is characterised in terms of 'voxels', i.e. three-dimensional pixels, wherein each voxel occupies a discrete volume. When producing data modelling a three-dimensional object, a voxel at a given location may have at least one characteristic. For example, it may be empty, or may have a particular color, or may represent a particular material, or a particular object property, or the like.

In some examples, data representing a three-dimensional object is processed to generate a print material coverage representation for at least a portion of the object. In some examples, the print material coverage representation defines print material data, for example detailing the amount of each of the available print materials (such as agent(s) to be printed onto a layer of the build material, or in some examples, build materials themselves), and their combination if needed. This may be specified as a proportional volume coverage (for example, X % of a region of a layer of build material should have agent Y applied thereto). Such print materials may be related to or selected to provided a property such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined using halftoning techniques.

In one example, a set of voxels within object model data may have an associated set of print material (or print material combination) volume coverage (Mvoc) vectors. The association may be made by use of a mapping. In a simple case, such a vector may indicate that X % of addressable locations in a given region of three-dimensional space should have one unit of a particular agent applied thereto, whereas (100-X) % should be left clear of agent. The Mvoc representation may provide the input for a 'halftoning' process to generate control data that may be used by an additive manufacturing system to produce a three-dimensional object. For example, it may be determined that, to produce desirable object properties, 25% of a layer of build material should have a particular agent applied thereto. The halftoning process determines where the drops of agent are to be deposited in order to provide 25% coverage, for example by comparing each location to a threshold value provided in a halftone threshold matrix.

In some examples, data representing a plane of a three-dimensional structure or object is 'rasterized', i.e. converted to series of discrete locations. The rasterized planes may be at the printable resolution of the three-dimensional printing apparatus to which control data may be provided.

Figure 1:
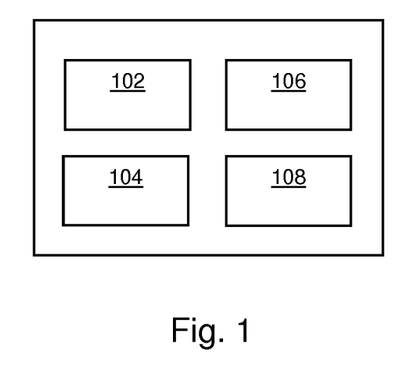
FIG. 1 is a converter for converting input object data representing a model of a three-dimensional object into a compressed form.

A converter 100 for converting input object data representing a model of a three-dimensional object into a compressed form is shown in FIG. 1. The data may, for example, be for use in generating a three-dimensional object by additive manufacturing processes.

The converter 100 comprises a data receiving module 102 to receive data representing object properties of a three-dimensional object to be generated by additive manufacturing apparatus; a data identifying module 104 to identify data representing a continuous region of the object with a common property specification; a sub-region defining module 106 to determine, within the data representing the continuous region, a set of contiguous sub-regions; and an object data module 108 to represent the continuous region as the set of sub-regions.

The data received by the data receiving module 102 may be, for example, an array of voxels, wherein each voxel may occupy a unique location within the object. The data may be received from a Computer Aided Design (CAD) package or the like. The object properties may include any, or any combination of color, flexibility, elasticity, rigidity, surface roughness, porosity, conductivity, inter-layer strength, density, and the like. A voxel may also be empty, indicating that at that location, no material is to exist.

The continuous region identified by the data identifying module 104 may be a continuous region in which the voxels have common object properties. In one example, the common property specification may be a common specification of a desired characteristic (for example, a region of a common color and density). In another example, the property specification may relate to a print material coverage representation, for example a specification of one or several proportions of print materials to be used to generate the object. In such an example, a mapping of object properties to material volume coverage (Mvoc) vectors may be performed, and a region identified by common Mvoc vectors identified as data having a common property specification. In some cases, this determination may be carried out for each of a set of properties individually, as a set, or as a sub-set of any specified properties. In some examples, a property specification may specify a range of data values. As such, a voxel may belong to a region having a common property specification if the object data and/or print material coverage representation for that voxel differs from that of others in the continuous region. For example, the property specifications of two voxels with different object data/print material coverage representation (as applicable) may be considered to be common if the object data/print material coverage representation are within a margin or range of each other, or if they are sufficiently similar.

The contiguous sub-regions defined by the sub-region defining module 106 may for example be specified in terms of object properties, or in terms of print material coverage.

By grouping portions of the object into at least one continuous region having common properties, the object may be fully described with fewer data points and therefore the file size to store a object model may be reduced, i.e. the data may be in a compressed form.

In some examples, a print material coverage representation representing the set of sub-regions is determined, for example specifying at least one print material to produce an object property. This may comprise mapping data indicative of object properties to print material coverage data, which may, in some examples be expressed in terms of a vector object such as an Mvoc. Alternatively, if the data is already expressed in terms of print material coverage, determining the print material coverage representation may comprises dividing the print material coverage representation into the identified set of contiguous sub-regions, in which case a set of print material coverage representations (for example, a set of Mvocs) is determined.

In some examples, the print material coverage representation, or the set of sub-regions, may be stored as data characterising the model. In some examples, the print material coverage representation, or the set of sub-regions, may replace the input data, for example in a memory or the like.

In some examples, the print material coverage representation of the object, for example representing the object in terms of vector object(s), may be used to generate control data for generation of a three-dimensional object according to the model of the object by an additive manufacturing apparatus.

In one example, each sub-region defined by the sub-region defining module 106 has a shape which is a scaled example of (a single, or common) predetermined shape or form, for example a polytope. A polytope is a geometric object, such as a polygon, or a polyhedron. Such a polytope form may for example be a cube, oblong, tetrahedron, etc. The polytope form may be a space filling polyhedron; i.e. one which can be stacked in three dimensions without leaving any space between polytopes. The set of polytopes is therefore made up of 'similar' objects, as the term is used mathematically, i.e. objects having the same relative proportions but different in size to one another. In some examples, there may be a predetermined polytope shape. In other examples, a polytope could be selected or determined, for example from a range of polytope shapes held in a memory, or as the result of a polytope generation process.

Such a selection or determination may be based on identified efficient representations of the object (for example the polytope which provides the smallest polytope set, given the shape of the sub-region). In other examples, the polytope form which, at the largest applicable size, best fills the sub-region may be selected or generated.

In some examples, therefore the shape of the continuous region is represented by a number of polytopes of different sizes. In one example, the largest sub-region defined by the sub-region defining module 106 is the largest example of the polytope form which can be contained within the continuous region. If, for example, the continuous region is a sphere of radius r, and the polytope is a cube, the largest polytope would be a cube with an interior diagonal dimension of 2r. In some examples, the smallest sub-region (i.e. the smallest polytope) defined by the sub-region defining module 106 may be the smallest example of the polytope form which can be individually addressed by an additive manufacturing apparatus. If both these conditions apply, and the polytopes are selected in size order from the largest to the smallest, with the polytope size reduced when no more polytopes of a given size can be placed, the set of vector objects represent the smallest set of that polytopes which fill the continuous region at the resolution of the additive manufacturing apparatus.

By using polytopes to represent data, the storage requirements may be reduced as the object may be at least substantially fully described, even without each location being described individually. Instead, the sub-object representation of the object may be stored.

In some examples, the sub-regions need not have the same form. However, compared to using a single sub-region form, the analysis to be carried out to identify the best placement and/or best set of variable form sub-regions is more complex. In addition, data characterising the object in terms of sub-regions would additionally include data indicating, for each sub-region, the sub-region shape or form.

Figure 2:
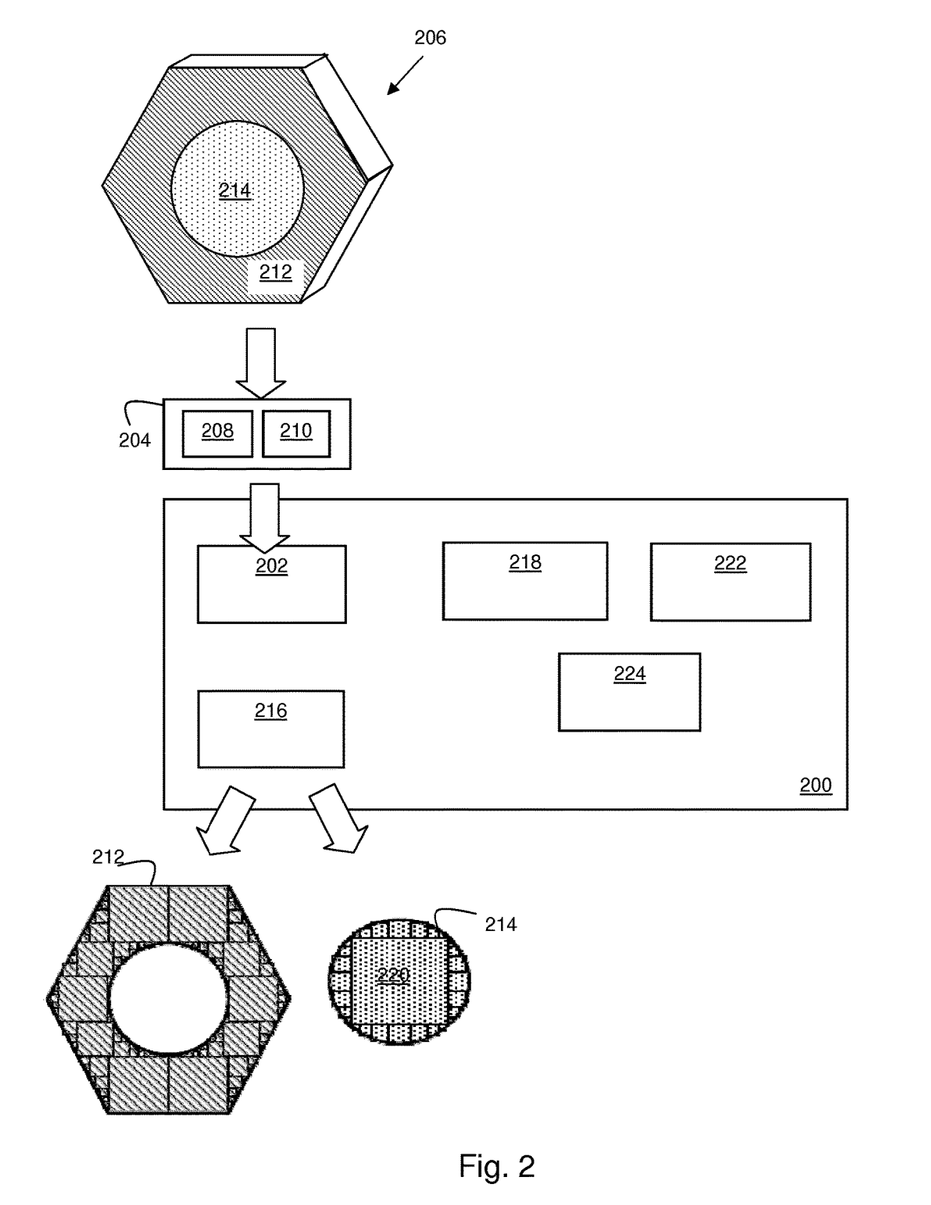
FIG. 2 is a simplified schematic of an example of apparatus for generating control data for production of a three-dimensional object.

An example of processing apparatus 200 for generating control data for production of a three-dimensional object is shown in FIG. 2. The apparatus 200 comprises an interface 202 to receive object data 204 representing a representing a model of a three-dimensional object 206, the data comprising object model data 208 and object property data 210. In this example, the object 206 is a substantially flat hexagonal prism comprising an outer region 212 having a first common set of object properties and an inner cylindrical region 214 having a second common set of object properties.

In some examples, the interface 202 may receive the object model data 208 and the object property data 210 as a single file; in other examples the interface 202 may receive portions of the object model data 208 and/or the object property data 210 as multiple data objects, wherein the object model data 208 and the object property data 210 are distributed across a number of associated data structures.

In one example, the object model data 208 may comprise voxels that are defined in a three-dimensional (also referred to herein as [x,y,z]) space, and may be generated by a computer aided design (CAD) application. A given voxel may have associated data that indicates whether a portion of the object 206 is present at that location.

The object property data 210 may comprise global and/or local object property data, e.g. certain object property values as defined in the object property data 210 may be associated with each voxel that defines the object and/or certain object property values may be associated with a set of voxels, e.g. ranging from individual voxels to all voxels associated with the object. Object properties may include, for example, color, flexibility, elasticity, rigidity, surface roughness, porosity, inter-layer strength, density, conductivity and the like, and may depend on the type of build material and/or agents used to generate an object.

In one example, the object data 204 representing the three-dimensional model 206 comprises a model of a three-dimensional object that has one or several object properties specified at every location within the model, e.g. at every [x, y, z] co-ordinate.

The apparatus 200 also comprises a categorising module 216 to determine a continuous region of the object having a common (i.e. sufficiently similar) property specification. In this example, two continuous regions—the hexagonal prism with a cut out cylinder 212 and the cylinder 214—are determined. These regions 212, 214 are continuous in that they each represent joined, rather than two or more isolated or non-contiguous, portions of the object 206. In this example, these regions may be identified directly from the object data 204. In other examples, the data relating to each voxel may be mapped to a print material coverage representation and a region of print material coverage representation having common property specification(s) may be identified. The categorising module 216 also determines sub-regions within the identified regions 212, 214.

The apparatus 200 further comprises a mapping module 218 to map object data representing a continuous region to at least one print material coverage representation, for example indicative of at least one print material to produce an object property. In this example, this comprises mapping a region identified as a continuous region having the same (or sufficiently similar) object property data 210 to a print material coverage representation. In other examples, however, as mentioned above, the mapping module 218 may first map object data 204 to a print material coverage representation (for example, an Mvoc vector), and the print material coverage representation is subsequently characterised as a region and then sub-regions by the categorising module 216.

In this example, each sub-region determined by the categorising module 216 has a shape which is a scaled example of a predetermined polytope having a cuboid form (shown in plan view in FIG. 2). Considering the cylindrical region 214, the largest cuboid 220 is positioned centrally and extends to the outer edges of the region 214. This cuboid 220 is the largest cuboid shape which can be wholly contained within the cylindrical region. The rest of the cylindrical region 214 is substantially filled with smaller cuboids in a 'fractal' like manner—the cuboids reduce in size as the maximum available volume decreases (with the largest possible cuboid always being placed) until the smallest cuboid, which, in this example, represents the smallest cuboid which can be individually addressed by a predetermined additive manufacturing apparatus. The outer region 212 is also divided into cuboids in a similar manner. Although in this example cuboids are used to populate both regions 212, 214, this need not be the case and the sub-region form may be different in different regions.

The apparatus 200 further comprises a rasterizing module 222 to generate a rasterized representation of a plane of at least a portion of the three-dimensional model object represented by the set(s) of vector objects. The rasterising module 222 may therefore generate slices of parallel planes of a model of the three-dimensional object, as represented by the print material coverage representation. If more than one continuous region with a common property specification exists (as in FIG. 2, which shows two such regions), these may be considered together or separately. In some examples, there may also be mappings related to voxels which are not part of a continuous region, and these may also be considered together with one, some or all sets or separately.

In one example, each slice defines a portion of a respective layer of build material that is to be processed by an additive manufacturing system. In a three-dimensional space that uses a three-coordinate system, e.g. that uses [x, y, z] co-ordinates, these parallel planes may be z-slices, planes that are parallel to x and y axes. Each z-slice may comprise portions of a model that have common z co-ordinates and that extend in the x and y dimensions. The number of z-slices may depend on a resolution of detail in the z dimension and/or the output resolution of a layer of build materials.

In one example, the rasterizing module 222 outputs a plurality of two-dimensional raster objects, each representing a plane of the three-dimensional space in which the object region 212, 214 being processed is defined. Each of these two-dimensional raster objects may comprise an image such as a bitmap made up of polytopes, and each polytope is associated with at least one object property value. In one example, each polytope may be associated with at least one object property. If one of the object properties relates to a color, the color may be defined in a color space, such as: a monochrome contone space, e.g. grayscale; a Red, Green, Blue (RGB) color space; the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space. A color value in these color spaces may comprise a continuous tone value, e.g. a value within a predefined range of values. For example, in a simple case, an RGB color value may comprise three 8-bit values; as such each red, green and blue value may be within the range of 0 to 255. Object properties may be defined implicitly and/or explicitly and may comprise any or any combination of, amongst others: a value indicating an available agent is to be used; a flexibility value; an elasticity value; a rigidity value; a surface roughness value; a porosity value; a strength value; and a density value.

Print material coverage representations may have a plurality of values, wherein each value defines a proportion for each, or each combination of materials (a "material primary" or MP) in an addressable area of a layer of a three-dimensional object to be generated. A material coverage representation may be provided as an Mvoc vector. For example, in an additive manufacturing system with two available materials—M1 and M2, where each material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit of M1 and M2, (i.e. M2 deposited over M1 or vice versa); and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sums to 1 or 100%.

The apparatus 200 further comprises a halftoning module 224 to carry out halftoning to generate control data for the production of a three-dimensional object.

In this example, the halftoning is carried out using a halftone threshold matrix which contains an array of threshold values. In one example, the threshold values are for carrying out a halftone operation that compares a value of the threshold matrix against a value of a print material (such as an agent(s)) or Color Probability distribution such as an Mvoc vector and chooses a single 'state', such as an agent or agent-combination, based on the threshold value. This matrix may be designed in a number of ways, including consideration of the total area coverage across all print materials to be applied per slice (which may be based on information received regarding the object to be generated, and/or on 'global' properties such as the minimum amount of material to be deposited in a given volume to create an object having a specific characteristics, such as a strength characteristic).

Figure 3:
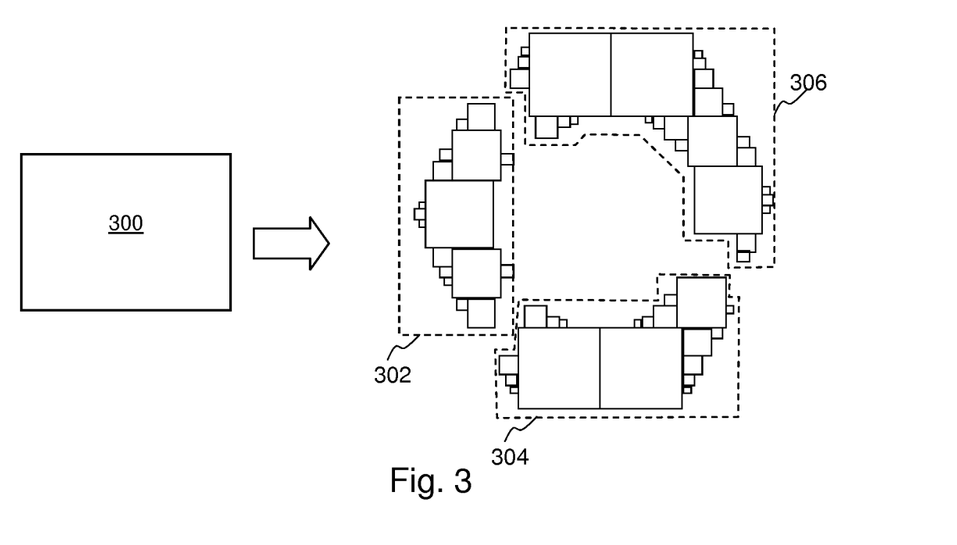
FIG. 3 is a simplified schematic of an example of a module for an apparatus for generating control data for production of a three-dimensional object.

In some examples, the apparatus 200 may further comprise a sub-object module 300. An example of a sub-object module 300 is shown in FIG. 3. The sub-object module 300 divides data representing the three-dimensional object in terms of sub-regions (for example, polytopes) into data representing three-dimensional sub-objects 302, 304, 306, each sub-object being represented by complete (and contiguous) sub-regions and being a portion of the three-dimensional object. The data representing the three-dimensional sub-objects 302, 304, 306 may be processed separately to generate control data for the production of physical sub-objects. Such physical sub-objects could be assembled to form the object and would have non-planar joints, allowing for robust assembly of an object made up of such physical sub-objects. In some examples, such sub-objects may be defined such that each can be printed by a single additive manufacturing apparatus, which may provide a constraint on the maximum size of a sub-object. This allows an object which is larger than the maximum object size of a given additive manufacturing apparatus to be produced as assembled sub-objects.

Figure 4:
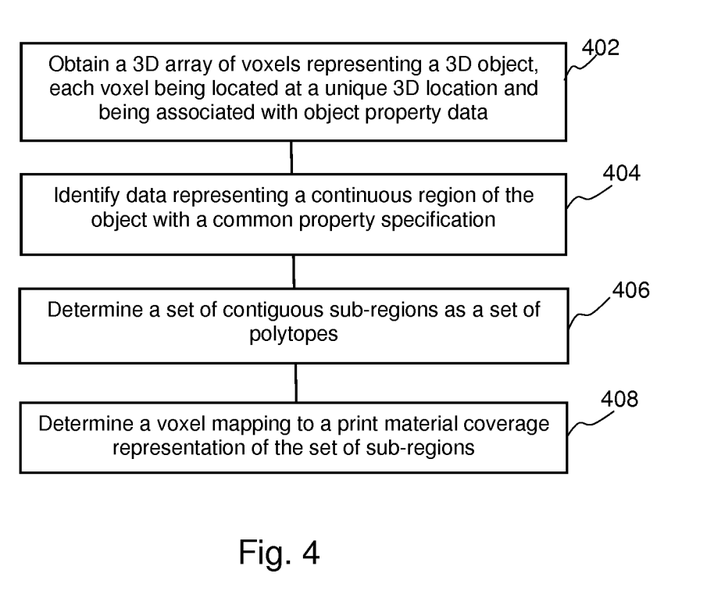
FIG. 4 is an example of a method for processing data representing a three-dimensional object.

An example of a method for generating control data for production of a three-dimensional object is set out in FIG. 4. The method comprises obtaining a three-dimensional array of voxels representing a three-dimensional object, each voxel being located at a unique three-dimensional location and being associated with object property data (block 402). Data representing a continuous region of the object with a common property specification is identified (block 404). In some examples, a property specification is a common property specification if it is sufficiently similar, for example being within a specified range. Within the data representing the continuous region, a set of contiguous sub-regions is determined as a set of polytopes (block 406). In an example, the polytopes of a set are scale representations of a particular polytope form, and the set of polytopes may be tessellated to provide a representation of the continuous region.

A mapping to at least one print material coverage representation which represents the set of sub-regions is determined (block 408). The print material coverage representation may be indicative of at least one print material to produce an object property. The mapping may be determined before the set of polytopes is defined (for example, each voxel is mapped, and the set of polytopes determined from the mapping), or after (the set of polytopes representing object property data is mapped to a print material coverage representation).

In some examples, voxels may be mapped to print material coverage representations comprising individual vector objects, and vector objects having the same, or sufficiently similar, print material volume coverage specifications are identified to define the continuous region, which is then divided into sub-regions. In other examples, voxels having the same, or sufficiently similar, object property data (for example relating to any of color, elasticity, conductivity, and the like) are identified to define the continuous region, and this region is divided in to sub-regions, which sub-regions may then be mapped to a print material coverage representation such as an Mvoc.

In some examples, different object representations could result depending on the order with which these processes are carried out, in particular if the common property specification allow some differences between values. Some differences may arise even if the property specifications are identical as multiple desired object properties may map onto the same print material coverage representation.

In some examples, rasterized representation of a plane of at least a portion of the three-dimensional object may be generated. This may be based on the mappings between voxels and print material coverage representation(s). The rasterized representation may then be subjected to halftoning to generate control data for production of a three-dimensional object.

In some examples, and for example as described in relation to FIG. 3, a contiguous subset of the polytopes may be designated to represent a three-dimensional sub-object portion of the model. Such subset(s) of polytopes may processed to generate control data for the production of a sub-object comprising a portion of the three-dimensional object.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute machine readable instructions to operate as the converter 100 or the apparatus 200, or any component or module thereof, or as the sub-object module 300. Thus functional modules of the apparatus 200 may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims.

Features described in relation to one example may be combined with or replaced by features described in relation to another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An apparatus, comprising:
a processor; and
a non-transitory storage medium storing instructions executable on the processor to:
receive object data representing a model of a three-dimensional (3D) object, the object data comprising object model data and object property data;
determine a continuous region of the 3D object having a common property specification;
determine, within the continuous region, a set of contiguous sub-regions, wherein determining the set of contiguous sub-regions comprises determining 3D polytopes of different sizes, each 3D polytope of the 3D polytopes representing a respective sub-region of the contiguous sub-regions;
map the object data to a print material coverage representation;
generate a rasterized representation of a plane of at least a portion of the model represented by the print material coverage representation; and
carry out halftoning of the rasterized representation to generate control data for production of the 3D object.

2. The apparatus of claim 1, wherein the instructions are executable on the processor to map the object data to the print material coverage representation by:
mapping the determined sub-regions to the print material coverage representation.

3. The apparatus of claim 1 wherein a smallest 3D polytope of the 3D polytopes contains a minimum volume individually addressable by the apparatus to generate the 3D object, and a largest 3D polytope of the 3D polytopes is a 3D polytope that can be wholly contained within the continuous region before other 3D polytopes are provided in the continuous region.

4. The apparatus of claim 1, wherein determining the 3D polytopes comprises identifying successively smaller 3D polytopes as portions of the continuous region are filled with respective 3D polytopes, and the instructions are executable on the processor to fill remaining portions of the continuous region with the successively smaller 3D polytopes.

5. The apparatus of claim 1, wherein the 3D polytopes comprise a first 3D polytope of a first shape and a second 3D polytope of a second shape different from the first shape.

6. The apparatus of claim 5, wherein the first shape is a cuboid shape, and the second shape is a spherical shape.

7. The apparatus of claim 1, wherein the rasterized representation comprises raster objects, wherein each raster object of the raster objects comprises an image made up of a 3D polytope of the 3D polytopes.

8. The apparatus of claim 1, wherein the halftoning comprises:
accessing a halftone threshold matrix containing an array of threshold values; and
comparing a value of a print material in the rasterized representation to a threshold value in the halftone threshold matrix.

9. A method performed by a system comprising a hardware processor, comprising:
obtaining a three-dimensional (3D) array of voxels representing a 3D model of a 3D object, each voxel of the array of voxels being located at a unique 3D location and being associated with object property data;
identifying data representing a continuous region of the 3D object with a common property specification;
determining, within the continuous region, a set of contiguous sub-regions as a set of 3D polytopes of different sizes, wherein the 3D polytopes of the set are scale representations of a predetermined polytope form, and the set of polytopes may be tessellated to provide a representation of the continuous region; and
determining a voxel mapping to a print material coverage representation of the set of contiguous sub-regions.

10. The method of claim 9, wherein the print material coverage representation comprises vector objects, and the same or similar vector objects are identified to define the continuous region.

11. The method of claim 9, wherein voxels having the same or similar object property data are identified to define the continuous region.

12. The method of claim 9, wherein a contiguous subset of the 3D polytopes represents a 3D sub-object, and the subset of 3D polytopes is processed to generate control data for the production of the 3D sub-object comprising a portion of the 3D object.

13. The method of claim 9, comprising:
identifying successively smaller 3D polytopes as portions of the continuous region are filled with respective 3D polytopes; and
filling remaining portions of the continuous region with the successively smaller 3D polytopes.

14. The method of claim 13, wherein a smallest 3D polytope of the set of 3D polytopes contains a minimum volume individual addressable by the system to build the 3D object, and wherein a largest 3D polytope of the set of 3D polytopes is a 3D polytope that can be wholly contained within the continuous region before other 3D polytopes are provided in the continuous region.

15. A non-transitory machine-readable storage medium comprising instructions that upon execution cause a system to:
- receive data representing object properties of a three-dimensional (3D) object to be generated by an additive manufacturing apparatus;
- identify data representing a continuous region of the 3D object with a common property specification;
- determine, within the continuous region, a set of contiguous sub-regions, wherein determining the set of contiguous sub-regions comprises determining 3D polytopes of different sizes, each 3D polytope of the 3D polytopes representing a respective sub-region of the contiguous sub-regions;
- represent the continuous region as the set of contiguous sub-regions;
- generate a print material coverage representation from the received data or the data representing the continuous region;
- generate a rasterized representation of a plane of at least a portion of a model represented by the print material coverage representation; and
- carry out halftoning of the rasterized representation to generate control data for the production of the 3D object.

16. The non-transitory machine-readable storage medium of claim 15, wherein determining the 3D polytopes comprises identifying successively smaller 3D polytopes as portions of the continuous region are filled with respective 3D polytopes, and wherein the instructions upon execution cause the system to fill remaining portions of the continuous region with the successively smaller 3D polytopes.

17. The non-transitory machine-readable storage medium of claim 15, wherein the 3D polytopes comprise a first 3D polytope of a first shape and a second 3D polytope of a second shape different from the first shape.

18. The non-transitory machine-readable storage medium of claim 17, wherein the first shape is a cuboid shape, and the second shape is a spherical shape.

19. The non-transitory machine-readable storage medium of claim 15, wherein the rasterized representation comprises raster objects, wherein each raster object of the raster objects comprises an image made up of a 3D polytope of the 3D polytopes.

20. The non-transitory machine-readable storage medium of claim 15, wherein the halftoning comprises:
- accessing a halftone threshold matrix containing an array of threshold values; and
- comparing a value of a print material in the rasterized representation to a threshold value in the halftone threshold matrix.

* * * * *

UNITED STATES PATENT AND TRADEMARK OFFICE
CERTIFICATE OF CORRECTION

PATENT NO. : 10,391,709 B2  
APPLICATION NO. : 15/545775  
DATED : August 27, 2019  
INVENTOR(S) : Jan Morovic et al.

Page 1 of 1

It is certified that error appears in the above-identified patent and that said Letters Patent is hereby corrected as shown below:

In the Claims

In Column 9, Line 64, in Claim 3, delete "claim 1" and insert -- claim 1, --, therefor.

Signed and Sealed this  
Twelfth Day of November, 2019

Andrei Iancu  
*Director of the United States Patent and Trademark Office*